United States Patent [19]

Victor

[11] 4,229,289

[45] Oct. 21, 1980

[54] FLUIDIZED BED APPARATUS AND PROCESS

[75] Inventor: John G. Victor, Darien, Ill.

[73] Assignee: Institute of Gas Technology, Chicago, Ill.

[21] Appl. No.: 19,441

[22] Filed: Mar. 12, 1979

[51] Int. Cl.² ..................... B07B 4/08; C10J 3/54; C10J 3/56

[52] U.S. Cl. .................................. 209/474; 209/494; 34/10; 34/57 A; 48/63; 48/77; 48/206; 48/210; 75/34; 106/100; 126/152 R; 266/172; 422/143; 422/311; 423/659; 423/DIG. 16; 110/165 R

[58] Field of Search .................. 48/197 R, 206, 210, 48/63, 64, 77; 422/143, 311; 423/659, DIG. 16; 75/34; 266/172; 110/165 R; 34/10, 57 A; 126/152 R; 106/100; 432/58; 209/138, 139 R, 140, 141, 474, 470, 476, 494

[56] References Cited

U.S. PATENT DOCUMENTS

| 2,422,262 | 6/1947 | Russell | 422/143 |
| 2,906,608 | 9/1909 | Jéquier et al. | 48/206 |
| 2,985,515 | 5/1961 | McKinley | 422/143 |
| 3,052,990 | 9/1962 | Tailer | 34/57 A |
| 3,935,825 | 2/1976 | Matthews et al. | 48/206 |

Primary Examiner—Peter F. Kratz
Attorney, Agent, or Firm—Thomas W. Speckman

[57] ABSTRACT

An apparatus and process for conduct of fluidized bed reactions having an improved grate wherein at least one substantially continuous open slot sufficiently wide for passage of heavy solid particles is provided for preferential removal of heavy particles from the fluidizing chamber. The apparatus and process is particularly useful in coal gasification applications.

14 Claims, 3 Drawing Figures

U.S. Patent    Oct. 21, 1980    4,229,289
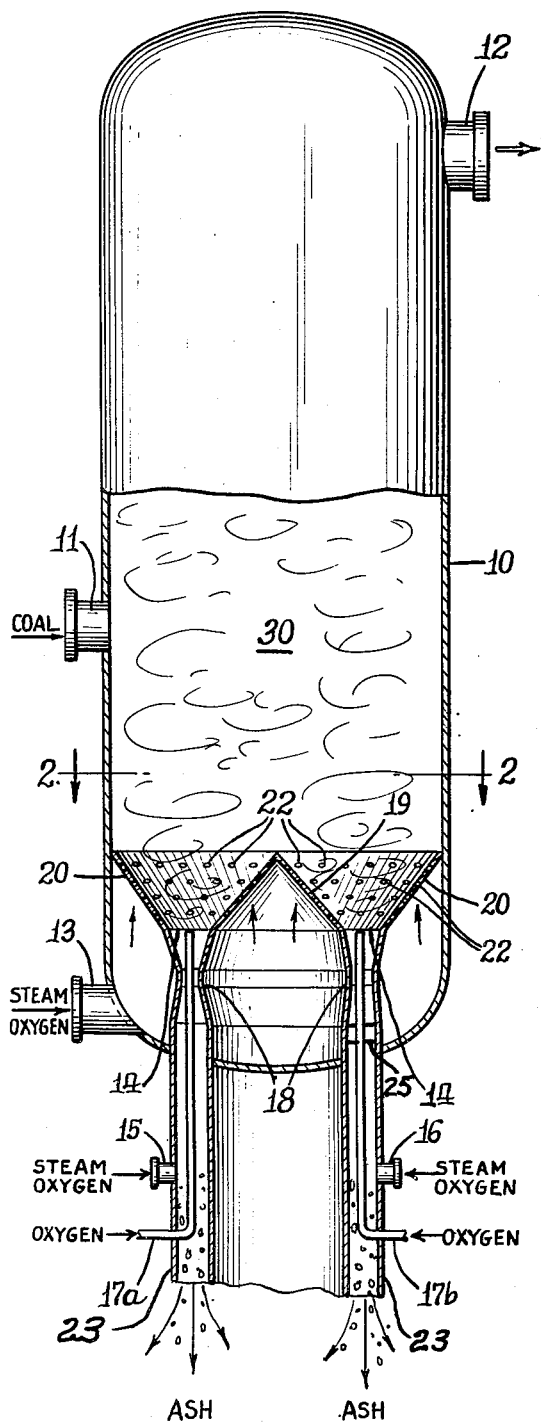
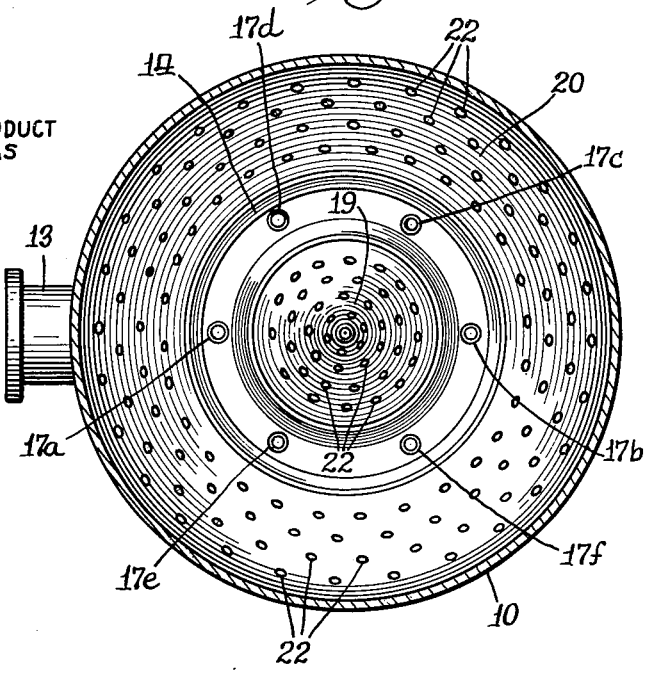
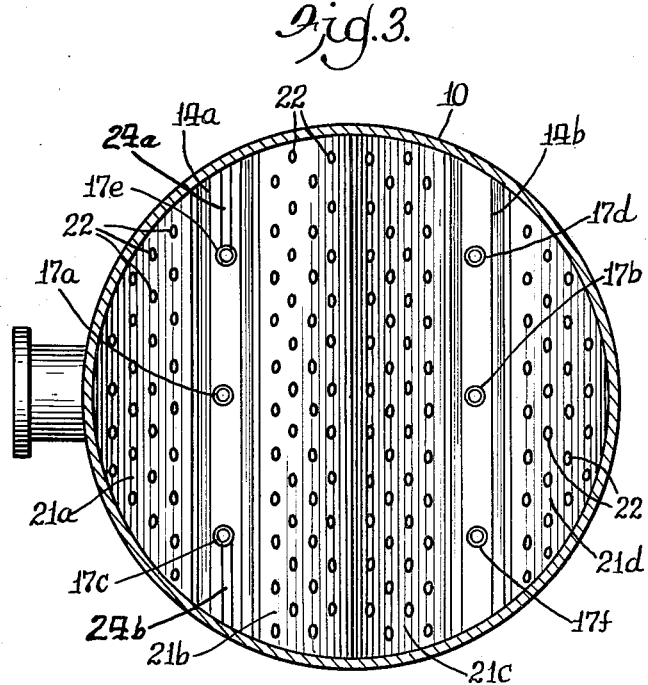

FLUIDIZED BED APPARATUS AND PROCESS

This invention relates to an improved fluidized bed apparatus and process of the type wherein a mass of fluidized solids are maintained above a grate by fluidizing gas passing through the grate to assist in maintaining the fluidized state. More particularly, the improvement of this invention relates to a grate for use in a fluidized bed apparatus wherein the grate has at least one substantially continuous open slot sufficiently wide for passage of agglomerated ash solids to an ash withdrawal conduit for removal of the agglomerated ash solids from the fluidizing chamber. The grate is formed by multiple portions sloping downwardly toward the slot which may form a circle or may be in the shape of one or more straight slots.

Fluidized beds are used in a large number of chemical processes and are particularly important in the gasification of coal. Various fluidized bed coal gasification devices are known to the art such as taught by U.S. Pat. No. 3,935,825 and U.S. Pat. No. 2,906,608. The teachings of each of those patents are incorporated herein by reference in their entirety. Both of the cited patents teach the withdrawal of agglomerated ash. The ash agglomerates are preferentially removed through a Venturi throat due to a high velocity jet of incoming gas such as steam, hydrogen, air, nitrogen, oxygen, or their derivatives, being formed at the Venturi throat against which only the agglomerates having sufficient downward momentum may fall through. The apparatus as taught by U.S. Pat. No. 2,906,608 has a grate which is a section of a cone sloping downwardly toward an agglomerate discharge passage located at the center. Such devices are satisfactory in tests where the reactor diameter was in the order of 3 to 4 feet and the Venturi throat diameter was in the order of 2 to 4½ inches. However, as the diameter of the gasifier is increased and the quantity of the ash agglomerate that must be discharged increases, the diameter of a single Venturi has to be increased so that the preferential agglomerate discharge may no longer be maintained. To maintain sufficiently high gas velocity to achieve classification of agglomerates from a single Venturi of large diameter also requires such a high quantity of gas that insufficient gas is available for flow through the grate. One attempt to solve this problem is taught by the U.S. Pat. No. 3,935,825 wherein several ash agglomerate discharge passages having Venturi throats are taught. However, if multiple discharge passages are used in the fashion taught by the U.S. Pat. No. 3,935,825, the construction of the grate becomes a mechanical problem due to thermal stresses and intersecting of conical surfaces. Further, uniform distribution of fluidizing gases and preferential discharge of agglomerates through the multiple discharge passages cannot be easily controlled.

It is an object of this invention to overcome many of the disadvantages of prior art fluidized bed devices and processes.

It is yet another object of this invention to provide an improved grate for a fluidized bed apparatus wherein the ash agglomerate passage from the fluidized bed zone is a substantially continuous open slot.

It is another object of this invention to provide an improved grate for a fluidized bed apparatus which may be scaled up in size while still providing preferential discharge of ash agglomerates.

It is still another object of this invention to provide an improved grate for a fluidized bed reactor which allows continuous bed discharge while providing sufficient gas flow throughout the grate to prevent dead zones in the fluidized bed.

It is yet another object of this invention to provide an improved grate for use in a fluidized bed reactor which can withstand thermal and mechanical stresses.

It is still another object of this invention to provide a process for fluidized bed reactions providing preferential removal of heavy solids.

These and other objects and features of the invention will become more apparent from the following description and figures showing preferred embodiments wherein:

FIG. 1 shows a partially sectioned fluidized bed reactor according to one embodiment of this invention;

FIG. 2 is a sectional view through the reactor as shown in FIG. 1 along line 2—2, showing an embodiment wherein the discharge passage is circular; and FIG. 3 is a cross-sectional view of another embodiment along line 2—2 shown in FIG. 1 wherein the discharge passages are straight open slots.

FIG. 1 shows a fluidized bed reactor according to this invention which may be used for conduct of fluidized bed chemical reactions. While the fluid bed reactor in FIG. 1 is shown as a coal gasifier, the same type of reactor may be used for metal ore reduction, cement manufacture, and the like. In FIG. 1, reactor 10 is shown with fluidized bed 30 fed by coal feed conduit 11 and the product gas removed by product gas conduit 12 in the upper portion of the reactor. The fluidized coal bed 30 is supported by grate portions 19 and 20. The grate has openings 22 for passage of gas such as steam, hydrogen, nitrogen, oxygen or oxygen containing gas to assist in maintenance of the particulate mass in a fluidized state and for providing reactant gases. Gases are provided to the grate openings from gas inlet conduit 13. Central grate portion 19 is provided such gases by conduits 25 which may also serve as anchors for conduits 17a-f. Grate portions 19 and 20 slope downwardly to discharge passage 14 which is formed by a substantially continuous open slot sufficiently wide for passage of the heavy particles desired to be removed. Discharge passage 14 is in communication with withdrawal conduit 23 having constricted area 18. Constriction 18 of withdrawal conduit 23 is sufficiently wide to permit passage of the heavy solids desired to be removed while increasing the velocity of upward passing gas sufficiently to allow preferential removal of the heavy particles and return of the lighter particles to the fluidized bed. Steam and oxygen is provided to the withdrawal conduit 23 by conduits 15 and 16. The lower ends of withdrawal conduit 23 are in communication with a pressure lock withdrawal system, not shown in the figures, which may be similar to that shown in U.S. Pat. No. 3,935,825.

FIG. 2 is a cross-sectional view along line 2—2 in FIG. 1 and shows the substantially continuous open slot 14 through the grate in circular form. As shown in FIGS. 1 and 2, the grate has central conical portion 19 with its apex upward and an inverted truncated conical outer portion 20, both conical portions being symmetrical about a common center line, and the discharge passage 14 being located at the intersection of the downwardly sloping conical portions. FIG. 3 is a cross section along the same line as FIG. 2 showing another embodiment of an apparatus of this invention wherein the grate has multiple downwardly sloping portions, flat sloping surfaces 21a and 21b sloping downwardly toward discharge passage 14a and downwardly sloping flat sections 21c and 21d sloping downwardly toward discharge passage of 14b. The embodiment shown in FIG. 3 appears similar to FIG. 1 in a vertical cross-sectional view. Both of these embodiments provide simplified grate design providing high physical strength without creating dead zones of discharge solids or inactive zones in the fluidized bed. Further, it is seen that either of these embodiments may be scaled in size upwardly or downwardly while maintaining the same width of discharge passage 14, but providing sufficiently greater length of discharge passage 14 to accommodate the greater volume of solid discharge in a larger reactor. While FIG. 3 shows two parallel discharge passages 14a and 14b, it is apparent that with large reactors, any number of discharge passages so arranged may be used to provide greater discharge areas while maintaining the simplified structure of the grate design.

The terminology "substantially continuous open slot" has been used to mean that desired reinforcing or bracing of the grates crossing the discharge passage may be used. Such reinforcing or bracket design would occupy a small amount of the discharge passage area.

The grate portions according to this invention, slope downwardly at angles of about 25° to about 60° to the vertical and different portions of the grate may have different angles. The walls of withdrawal conduit 23 leading to and away from constricted area 18, may have angles of about 5° to about 30° with the vertical, preferably about 10° to about 20°. While the grates and the withdrawal conduit in the region of the constrictor area shown in the figures have straight sloping surfaces, both the grates and the withdrawal conduit may have convex or concave curved or multiple straight sided configuration.

We have found that using the substantially continuous open slot for particle discharge, the particles discharge along the wall of withdrawal conduit 23. Thus, the center portion of the opening in constricted area 18 may be blocked to reduce the quantity of gas required to maintain the desired velocity without significantly decreasing the discharge capacity of the withdrawal conduit. For example, as shown in FIG. 3, gas flow restrictor panels 24a and 24b may be installed in the central portion of the reduced cross-sectional portion 18 of withdrawal conduit 23. The gas flow restrictor panels may extend for the full length of the discharge passage 14 or for only a portion of the length as shown in FIG. 3.

Gas inlet conduits shown in the drawings as 17a through 17f may also extend upwardly through the central portion of constricted area 18 of withdrawal conduit 23 without significantly decreasing the discharge capacity of the withdrawal conduit. From 2 to about 10 gas inlet conduits are suitable. By feeding reactant gases such as enriched oxygen, in the case of coal gasification, higher temperature zones may be created in the fluidized bed to help in the formation of ash agglomerates. The formation of ash agglomerates and their discharge may be controlled in a similar manner to that taught in the above cited patents.

The improved fluidized reactor grate of this invention has at least one substantially continuous open slot sufficiently wide for passage of heavy solid particles for preferentially removing the heavy solid particles from a fluidizing chamber. The grate has multiple downwardly sloping portions with such an open slot at the intersection of the downwardly sloping portions, the open slot being in the form of a circle or multiple straight open slots. The invention also includes an improved process for conduct of fluidized bed reactions wherein heavy particles are preferentially passed from the mass of fluidized particles through at least one substantially continuous open slot sufficiently wide for downward passage of such heavy particles and upward passage of gas at a velocity sufficient to preferentially permit downward passage of the heavy particles while returning lighter particles to the fluidized bed. While the invention has been specifically exemplified with respect to coal gasification, it is to be understood that both the apparatus and process are applicable to a wide variety of different fluidized bed reactions.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. In an apparatus for contacting a mass of fluidized solids with a gaseous medium and withdrawing heavy solid particles from said mass while maintaining lighter solid particles in said mass wherein the apparatus comprises a fluidizing chamber, a sloping, perforated grate in the lower portion of said fluidizing chamber to support said mass of fluidized solids and having means for passing a gaseous medium through said grate to assist in maintaining said mass in a fluidized state and means for withdrawal of said heavy solid particles, the improvement comprising; said grate being sloping and perforated for passage of gas and retention of said solids and having at least one substantially continuous open slot sufficiently wide for passage of said heavy solid particles and in communication with a withdrawal conduit for preferentially removing the heavy solid particles from the fluidizing chamber and returning lighter solid particles to said mass of fluidized solids, said withdrawal conduit having a reduced cross section portion spaced from said grate open slot, and wherein said at least one open slot is: (a) an annular shaped opening in said grate and said grate comprises a conical central portion having its apex upward and an inverted truncated conical outer portion, both conical portions symmetrical about a common center line, said annular open slot being located at the intersection of the downwardly sloping conical portions, or (b) at least one straight open slot extending across substantially the entire width of said grate and said grate comprises multiple downwardly sloping portions with said at least one straight open slot located at the intersection of two downwardly sloping portions.

2. The apparatus of claim 1 wherein said open slot is an annular shaped opening in said grate and said grate comprises a conical central portion having its apex upward and an inverted truncated conical outer portion, both conical portions symmetrical about a common center line, said annular open slot being located at the intersection of the downwardly sloping conical portions.

3. The apparatus of claim 1 wherein said grate comprises multiple downwardly sloping portions and said open slot comprises at least one straight open slot located at the intersection of two downwardly sloping portions.

4. The apparatus of claim 2 having two parallel open slots.

5. The apparatus of claim 1 wherein said reduced cross section portion has a gas flow restrictor panel in its central portion.

6. The apparatus of claim 1 having 2 to about 10 conduits passing through said withdrawal conduit to said fluidized bed.

7. In a process comprising contacting a mass of fluidized particles with a gaseous medium wherein said fluidized particles are maintained on a grate through which a gaseous medium is passed to assist in maintaining said fluidized mass and withdrawing heavy particles from said fluidized mass through a withdrawal conduit, the improvement comprising; preferentially passing heavy particles from said mass of fluidized particles through at least one substantially continuous open slot sufficiently wide for downward passage of said heavy particles and upward passage of gas at a velocity sufficient to preferentially permit downward passage of said heavy particles while returning lighter particles to the fluidized bed, said withdrawal conduit having a reduced cross section portion spaced from said grate open slot, and wherein said at least one open slot is: (a) an annular shaped opening in said grate and said grate comprises a conical central portion having its apex upward and an inverted truncated conical outer portion, both conical portions symmetrical about a common center line, said annular open slot being located at the intersection of the downwardly sloping conical portions, or (b) at least one straight open slot extending across substantially the entire width of said grate and said grate comprises multiple downwardly sloping portions with said at least one straight open slot located at the intersection of two downwardly sloping portions.

8. The process of claim 7 wherein said at least one open slot is an annular shaped opening.

9. The process of claim 7 wherein said at least one open slot is at least one straight open slot extending across substantially the entire width of said grate.

10. The process of claim 7 wherein a gas is passed to the fluidized bed through multiple conduits passing through said open slot.

11. The process of claim 7 wherein said fluidized particles are coal.

12. The process of claim 11 wherein enriched oxygen is passed to the fluidized bed of coal through multiple conduits passing through said open slot.

13. The process of claim 7 wherein gas is fed to said fluidized bed through said open slot.

14. The process of claim 7 wherein gas flow restrictor panels block gas flow through at least a portion of said reduced cross section area.

* * * * *

Disclaimer 4,229,289.—*John G. Victor*, Darien, Ill. FLUIDIZED BED APPARATUS AND PROCESS. Patent dated Oct. 21, 1980. Disclaimer filed Oct. 27, 1983, by the assignee, *Institute of Gas Technology*.

Hereby enters this disclaimer to claims 6, 10 and 12 of said patent.

[*Official Gazette December 13, 1983.*]